United States Patent [19]
Fleckenstein

[11] 3,939,142
[45] Feb. 17, 1976

[54] PHENYLAZOPHENYL DYESTUFF

[75] Inventor: Erwin Fleckenstein, Hofheim, Taunus, Germany

[73] Assignee: Hoechst Aktiengesellschaft, Frankfurt, Germany

[22] Filed: Aug. 6, 1974

[21] Appl. No.: 495,191

[30] Foreign Application Priority Data
Aug. 6, 1973  Germany............................ 2339713

[52] U.S. Cl. ................ 260/205; 260/156; 260/197; 260/207; 260/146 R; 260/154; 260/152
[51] Int. Cl.² ........................................ C07C 115/00
[58] Field of Search ............ 260/207, 567.6 M, 205

[56] References Cited
UNITED STATES PATENTS

| | | | |
|---|---|---|---|
| 2,821,526 | 1/1958 | Boyd ....................... | 260/567.6 M X |
| 2,967,858 | 1/1961 | Merian et al. ...................... | 260/205 |
| 3,272,793 | 9/1966 | Taber et al. ..................... | 260/207 X |
| 3,542,758 | 11/1970 | Heger ............................. | 260/154 X |
| 3,694,426 | 9/1972 | Doss ....................... | 260/207 X |
| 3,712,881 | 1/1973 | Angliker et al................. | 260/207 X |
| 3,767,680 | 10/1973 | Kolliker et al.................. | 260/207 X |

FOREIGN PATENTS OR APPLICATIONS

| | | | |
|---|---|---|---|
| 1,184,825 | 3/1970 | United Kingdom................ | 260/207 |
| 224,009 | 9/1959 | Australia............................ | 260/205 |

Primary Examiner—Allen B. Curtis
Attorney, Agent, or Firm—Connolly and Hutz

[57] ABSTRACT

Basic azo dyestuffs, free from sulfo groups and having the formula

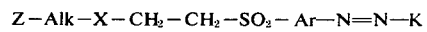

$$Z-Alk-X-CH_2-CH_2-SO_2-Ar-N=N-K$$

wherein Z is the radical of a tertiary amino group or of a quaternary ammonium group, Alk is alkylene of two to five carbon atoms, X is oxygen, Ar is phenylene unsubstituted or substituted by alkyl of one to four carbon atoms, alkoxy of one to four carbon atoms and/or chlorine or bromine, and K as the radical of a coupling component is the radical of a tertiary amine of the benzene series, the radical of 2,6-diamino-3-cyano-4-methyl pyridine or a derivative thereof or the radical of the 2-hydroxynaphthalene series, which are suitable for the preparation of writing and stamping inks or pastes for ball-point pens as well as suitable in offset printing and for the dyeing, printing or mass dyeing of, for example, tannined cellulose fibers, silk, hair, leather, acetate silk, polyamide fibers or acid modified polyolefins, polyamide or polyester fibers and fibers containing polyacrylonitrile or polyvinylidene cyanide. The dyeings obtained on these fibers have, in general, a high color intensity and, in general, good fastness to light and to wet processing. The dyestuffs can be used in slightly acid and strongly acid baths and are stable at a temperature above 100°C as used in high-temperature dyeing. Wool is completely reserved by the dyestuffs under normal dyeing conditions.

3 Claims, No Drawings

PHENYLAZOPHENYL DYESTUFF

The present invention relates to basic azo dyestuffs, a process for their preparation and their use.

The present invention provides basic azo dyestuffs which are free from sulphonic acid groups and have the general formula $$Z - Alk - X - CH_2 - CH_2 - SO_2 - Ar - N = N - K \quad (I)$$

wherein Ar is the phenylene radical or the naphthylene radical which may be substituted by halogen atoms, for example, chlorine or bromine atoms, alkyl groups of one to four carbon atoms, alkoxy groups of one to four carbon atoms, alkylene-carbonyloxy-alkyl groups having a total of three to six carbon atoms, carbonyloxyalkyl groups having a total of two to six carbon atoms, alkylsulfon groups of one to four carbon atoms, alkanoylamino groups of two to four carbon atoms, acyl groups of aliphatic carboxylic acids of two to five carbon atoms or acyl groups of aromatic carboxylic acids of the benzene series, such as the acetyl, propionyl, benzoyl, methylbenzoyl, chlorobenzoyl or nitrobenzoyl group, by nitro, trifluoromethyl and/or carbamoyl or sulfamyl groups, X is an oxygen atom or a sulfur atom, Alk is a linear or branched alkylene radical of two to eight carbon atoms, Z is the radical of a tertiary amino group or a quaternary ammonium group and K is the radical of a coupling component which is free from sulfonic acid groups.

The new dyestuffs can be obtained a. by coupling the diazonium compound of an amine of the formula II $$Z - Alk - X - CH_2CH_2SO_2 - Ar - NH_2 \quad (II)$$

wherein Ar, X, Alk and Z are defined as above, with a coupling component H — K as defined above or b. by treating an azo dyestuff of the formula III $$Z - Alk - X - CH_2CH_2SO_2 - Ar - N = N - K \quad (III)$$

wherein Ar, X, Alk and K are defined as above and Z is the radical of a tertiary amino group, with alkylating agents.

The amines of the formula II may be diazotized according to known methods, for example, with alkali metal nitrite and an inorganic acid, for example, hydrochloric acid, sulfuric acid or phosphoric acid, or with nitrosylsulfuric acid.

The coupling with the coupling components may also be carried out in known manner, for example, in neutral to acid medium, if necessary, in the presence of sodium acetate or similar buffer substances influencing the coupling speed or of catalysts, for example, dimethyl formamide, pyridine or the salts thereof.

The amines of the formula II can be obtained by the addition reaction of compounds of the formula HX — Alk — Z, wherein X, Z and Alk are defined as above, in alkaline media with compounds of the formula $CH_2 = CH_2 - SO_2 - AR - NH_2$ wherein Ar is defined as above.

Suitable tertiary amino groups for Z are, for example, preferably, optionally substituted dialkyl amino groups, dicycloalkylamino groups or heterocyclic amino groups, for example, morpholino, pyrrolidino or piperidino groups, especially, however, the dialkylamino groups which contain one to six carbon atoms in the alkyl radical and, optionally, may be substituted by chlorine, hydroxy, methoxy, ethoxy, cyano or acyloxy groups of lower aliphatic carboxylic acids.

The quaternary ammonium group for Z may have the formula

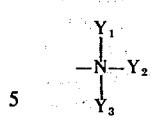

wherein $Y_1$ and $Y_2$ each stands for an alkyl radical, preferably an alkyl radical of one to six carbon atoms, an aralkyl or cycloalkyl radical, $Y_3$ is hydrogen, an alkyl, aralkyl, cycloalkyl or alkoxy radical or an amino group and N may form a heterocyclic ring with $Y_1$, $Y_2$ and/or $Y_3$.

Suitable coupling components are aromatic or heterocyclic compounds coupling in o- or p-position to a hydroxy group or a primary, secondary or tertiary amino group which compounds are free from sulfonic acid groups. Of the series of components suitable for this purpose which effect the coupling reaction in o- or p-position to a hydroxy group, are aromatic or heterocyclic hydroxy compounds and such compounds which contain an enolisable or enolised ketomethylene group which is in the heterocyclic ring. Compounds of this kind are, for example, phenol, the derivatives substituted in 2- or 4-position of the phenol, such as o- and p-cresol, p-chlorophenyl, 4-hydroxy-1,2-xylene, 4-hydroxyacetophenone and hydroquinone-monomethyl ether, the derivatives substituted in 4-position of the α-naphthol, such as 4-chloro-naphthol, 4-methoxy-naphthol and 4-benzoyl-1-naphthol, β-naphthol and the derivatives thereof, such as 6-bromo-2-naphthol, 7-hydroxy-2-methoxynaphthalene, 1-benzoylamino-7-naphthol and 4-benzolazo-1-amino-7-naphthol, as well as 6-hydroxyindazole, 6-hydroxy-quinoline, 8-hydroxy-quinoline, 4-hydroxy-1-alkyl-2-quinolone, 6-hydroxy-2-pyridone, 3-hydroxydiphenylamine, 2-hydroxy-carbazole, 5-hydroxybenzthiazole, 3-hydroxydiphenyleneoxide and 5-pyrazolones.

In addition to these monohydroxy compounds suitable coupling components are also polyhydroxy compounds coupling in o-position to the hydroxy groups of the aromatic or heterocyclic series, for example resorcinol, benzoyl-resorcinol, terephthaloyl-bis-resorcinol, 2,6-dihydroxynaphthalene, 2,4-dihydroxy-quinoline and 3,6-dihydroxy-diphenylene-dioxide. Suitable are also alkyl or aryl amides of aromatic or heterocyclic hydroxycarboxylic acids or of acylacetic acids, for example, alkyl or aryl amides of 2,3-hydroxy-naphthoic acids, 2-hydroxycarbazole-3-carboxylic acids, 3-hydroxy-diphenyleneoxide-2-carboxylic acids, of the acetoacetic acid or the benzoylacetic acid.

Suitable coupling components for the process of the invention which effect coupling in o- or p-position to a primary, secondary or tertiary amino group are aromatic or heterocyclic amino compounds. Suitable primary amines are, for example aniline, toluidine, xylidine, anisidines, phenylene diamines, tolylene diamines, aminocresol ether, alkoxy anilines, chloroanilines, 3-acylaminoanilines, dialkoxy anilines, naphthyl amines as well as heterocyclic amines, for example, aminopyrimidines, 5-aminopyrazoles, 6- or 7-aminoindazoles or 8-aminoquinolines. Suitable secondary or tertiary amines are compounds of the benzene or naphthalene series, in which case the benzene or naphthalene radical may contain further substituents, for example, halogen atoms, alkyl, alkoxy, carbalkoxy, carboxy, alkylsulfonyl, carbamyl, sulfamyl, amino, trifluoromethyl, acyl or acylamino groups. Suitable substituents for the secondary or tertiary amino groups are, for example, lower alkyl radicals, such as methyl, ethyl, propyl or butyl radicals, or aralkyl, cycloalkyl or aryl radicals in which, optionally, further substituents may be contained, for example, halogen atoms, hydroxy, cyano, acyloxy, carbalkoxy, carbamyl, dialkylamino, phenyl, alkoxy, alkyl, acyl, pyridyl, dicarboximido, alkylsulfon, arylsulfon, alkylsulfonylamino, sulfamyl or phenoxy groups. In the tertiary amines, the alkyl groups may, optionally, form with one another or together with a nitrogen or oxygen atom hydrated hetero rings, such as the piperidino, morpholino or piperazino ring.

Suitable coupling components are, furthermore, indoles, for example, indol, 2-alkylindoles, 2-arylindoles, 1,2-dialkylindoles, 1-alkyl-2-aryl-indoles or 1-alkylindoles and the derivatives thereof substituted in the benzene nucleus which may contain non ionic substituents in the alkyl or aryl radicals.

Suitable coupling components are, furthermore, 1,2,3,4-tetrahydroquinolines, or 1,2,3,4-tetrahydrobenzoquinolines, which may contain optionally substituted alkyl radicals in the nitrogen atom, as well as benzomorpholines, benzopiperazines, 2-methylene-1,3,3-trialkylindolines, 2-cyanomethylene-1,3-dialkyl-benzimidazolines, 1-alkyl-, 2-alkyl- or 1,2-dialkyl-perimidines, 4,5-dialkyl- or 4,5-dialkyl- or 4,5-diarylimidazoles, arylpyrazolines, for example, 1,5-diphenyl-3,5-dimethylpyrazoline-Δ2,1-(α-naphthyl)-3,5,5-trimethyl-pyrazoline-Δ2,1-phenyl-3,5,5-trimethylpyrazoline-Δ2 or 1-(2'-methoxy-5'-methylphenyl)-3,5,5-trimethylpyrazoline-Δ2, 2,6-diamino-3-cyano-4-alkylpyridines of 1,3-indandion.

The alkylation is carried out at elevated temperature, optionally by adding acid-binding agents, such as magnesium oxide, magnesium carbonate, sodium carbonate, calcium carbonate or sodium bicarbonate, and, optionally, under pressure. The most favourable conditions in each case can easily be evaluated by preliminary tests.

Optionally, the alkylation can also be carried out in water.

Suitable alkylating agents are alkyl halides, aralkyl halides, halogenoacetamides, β-halogenopropionitriles, halohydrins, alkylene oxides, acrylic acid amide, alkyl esters of sulfuric acid or alkyl esters of the organic sulfonic acids.

Suitable alkylating agents are for example methyl chloride, methyl bromide or methyl iodide, ethyl bromide or ethyl iodide, propyl bromide or propyl iodide, benzyl chloride, chloroacetamide, β-chloropropionitrile, ethylene chlorohydrin, dimethyl sulfate, benzenesulfonic acid methyl ester, p-toluenesulfonic acid methyl ester, -ethyl ester, -propyl ester or -butyl ester. The alkylation is advantageously effected in an inert organic solvent, for example, in a hydrocarbon, a chlorohydrocarbon or a nitrohydrocarbon, such as benzene, toluene, xylene, tetrachlorethane, chloroform, carbon tetrachloride, mono- or dichlorobenzene or nitrobenzene, in an acid amide or acid anhydride, such as dimethyl formamide, N-methylacetamide or acetic acid anhydride, in dimethylsulfoxide or in a ketone, such as acetone or methyl ethyl ketone. An excess of the alkylating agent may be used instead of an organic solvent.

In a modification of the processes mentioned above, the dyestuffs of the invention may also be obtained by reacting azo dyestuffs of the formula IV

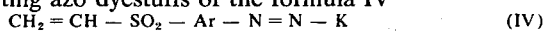

$$CH_2 = CH - SO_2 - Ar - N = N - K \qquad (IV)$$

wherein Ar and K are defined as above, with compounds of the formula HX—Alk—Z, wherein X, Alk and Z are defined as above.

The dyestuffs of the invention preferably contain as anion $X^-$ the anion of a strong acid, for example, sulfuric acid or the semi-esters thereof, an arylsulfonic acid or a hydrohalic acid. These anions used in the invention may also be replaced by anions of other acids, for example, phosphoric acid, perchloric acid, acetic acid, oxalic acid, lactic acid, propionic acid, maleic acid, malonic acid or tartaric acid. The dyestuffs may also be obtained in the form of their double salts with zinc or cadmium halides. The nature of the anionic radical does not influence the properties of the dyestuffs as long as the radical is colorless and does not affect the solubility of the dyestuffs in undesired manner.

The dyestuffs of the invention are suitable for the preparation of writing and stamping inks or pastes for ballpoint pens and can also be used in offset printing. They are also suitable for the dyeing, printing or mass dyeing of tannined cellulose fibres, silk, hair, leather, coco fibres, jute, sisal or synthetic fibres, such as acetate silk, polyamide fibres or acid modified polyolefin, polyamide or polyester fibres, especially however, of fibres containing polyacrylonitrile or polyvinylidene cyanide. The dyeings obtained on these fibres have, mostly, a high color intensity and, in general, good fastness to light and to wet processing, for example to washing, fulling, cross-dyeing, carbonizing, chlorine treatment and perspiration, as well as to decatizing, steaming, ironing, rubbing and solvents. The dyestuffs are, generally, unaffected by changing the pH of the dyebath and can, therefore, be used in slightly acid and in strongly acid baths. They are also stable at a temperature above 100°C as used in high-temperature dyeing. Wool is completely reserved by the dyestuffs under normal dyeing conditions.

The dyeing is preferably carried out in an aqueous medium at the boiling temperature or at a temperature above 100°C under pressure in closed vessels. The dyestuffs may also be applied from organic solvents.

The dyestuffs may also be added to spinning solutions for the preparation of polyacrylonitrile containing fibers, but they also dye the undraft fibers.

To prepare the aqueous dyebaths and printing pastes, the dyestuffs may be used in the form of powders which may if necessary contain extenders, for example, inorganic salts, dextrin and, optionally, further additives. It is, however, more advantageous to use concentrated aqueous solutions of the dyestuffs which are easier to handle, for example those containing from about 20 to 60 % of dyestuff, one or more low aliphatic acids, such as formic acid, acetic acid, propionic acid or lactic acid as well as further additives where required, such as water soluble polyvalent alcohols, the ethers or esters thereof, polyethers, aliphatic carboxylic acid amides, lactams, lactones, nitriles, dimethyl sulphoxide, diacetone alcohol, dioxane, tetrahydrofuran or urea and water.

To prepare the dyebaths which only contain organic solvents, for example, chlorohydrocarbons, concentrated solutions are advantageously used which contain the dyestuff as free base or as salt of a monobasic organic salt, chlorohydrocarbons, organic acids and polar organic solvents.

The dyestuffs of the invention, together with anionic precipitating agents, for example, argillaceous earth, tannin or heteropoly acids, for example, phosphorus tungstenic acid or phosphorus molybdenic acid form pigments fast to light which can advantageously be used in paper printing.

Among the new dyestuffs of the invention there are especially to accentuate those in which Alk is an alkylene radical of two to five carbon atoms, especially an alkylene radical of two or three carbon atoms, X is an oxygen atom, Ar is a phenylene radical which may be substituted by alkyl groups of one to four carbon atoms, by alkoxy groups of one to four carbon atoms and/or by chlorine or bromine atoms in which Ar may especially be a radical of the formula

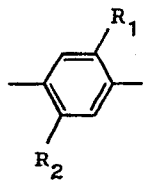

wherein $R_1$ stands for hydrogen, chlorine, bromine, a methyl or ethyl group or a methoxy or ethoxy group and $R_2$ stands for a hydrogen atom, a methyl or ethyl or methoxy or ethoxy group and in which K is a coupling component which belongs to a tertiary amine of the benzene series, the 2,6-diamino-3-cyan-4-methyl-pyridine or a derivative of this compound or the 2-hydroxy-naphthalene series.

Especially preferred are dyestuffs which have the general formula

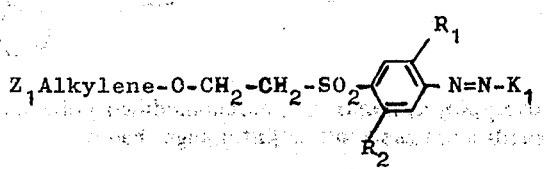

wherein $Z_1$ is a radical of the formula

or the quarternary salt thereof of the formula

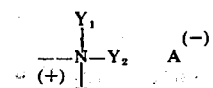

wherein $Y_1$ and $Y_2$ are identical or different and each is an alkyl radical of one to six, preferably one to four, especially one or two carbon atoms or a benzyl radical or cyclohexyl radical, $Y_3$ is a hydrogen atom, an alkyl radical of one to four carbon atoms, a benzyl radical or a lower alkoxy group and/or $Y_1$, $Y_2$ and/or $Y_3$ together form a heterocyclic ring, especially a morpholine, piperidine or pyridine ring with the nitrogen atom and $A^{(-)}$ is an anion, alkylene stands for an alkylene radical of two or three carbon atoms, $R_1$ is hydrogen, chlorine, bromine, the methoxy, ethoxy, methyl or ethyl group, $R_2$ is hydrogen, the methoxy, ethoxy, methyl or ethyl group and $K_1$ is a radical of the formula

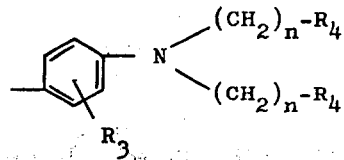

or of the formula

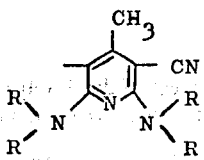

or of the formula

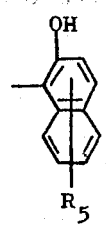

in which formulae $R_3$ is hydrogen, an alkyl group of one to four carbon atoms, an alkoxy group of one to four carbon atoms, an acetylamino group or a chlorine or bromine atom, the radicals $R_4$ are identical or different and each stands for a hydrogen atom, a hydroxy, cyano, acetoxy or alkoxy group of one to four carbon atoms or a phenyl radical or for a chlorine or bromine atom, $n$ is identical or different in each case and is 1, 2, 3 or 4, the radicals R are identical or different and each stands for a hydrogen atom or a radical of the formula $—(CH_2)_n—R_4$, wherein $R_4$ and $n$ are defined as above, and $R_5$ is hydrogen, a chlorine or bromine atom, an alkyl or an alkoxy group of one to four carbon atoms, the benzoylamino or acetylamino group or a phenylamidocarbonyl group optionally substituted in the nucleus.

The following examples illustrate the invention, the parts and percentages being by weight, unless stated otherwise:

EXAMPLE 1

27.2 Parts of the compound of the formula

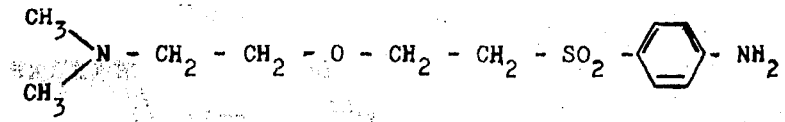

(prepared by reacting 4-aminophenyl-vinylsulfone with N,N-dimethyl-β-amino-ethanol in the presence of sodium hydroxide) were diazotized in usual manner. 14.8 parts of 2,6-diamino-3-cyano-4-methyl-pyridine dissolved in 100 parts of 2 N hydrochloric acid were added to the diazonium salt solution.

After coupling being terminated the dyestuff solution was adjusted to pH 9 with dilute sodium hydroxide solution, the precipitated dyestuff was suction-filtered, washed with water and dried at 60°C.

30.2 Parts of a dyestuff of the formula

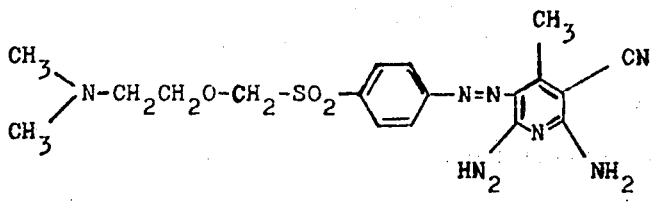

were obtained. This dyestuff dyed polyacrylonitrile and acid modified polyester fibers from an acid bath in very fast yellow shades.

EXAMPLE 2

35.1 Parts of the compound of the formula

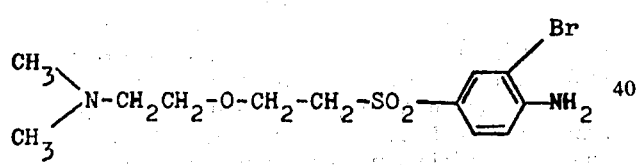

were diazotized in usual manner. 24.9 Parts of N-β-cyanethyl-N-phenethyl-aniline, dissolved in 100 parts of glacial acetic acid, were added to the diazonium salt solution. After coupling being finished, the dyestuff was precipitated by adding sodium chloride, suction-filtered and dried at 60°C.

The dyestuff obtained had the formula

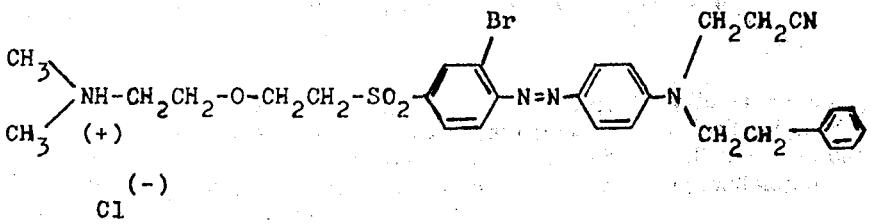

It dyed polyacrylonitrile and acid modified polyester fibers in fast orange shades.

EXAMPLE 3

30 Parts of the compound of the formula

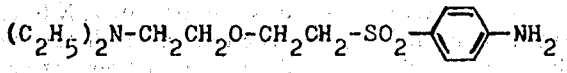

were diazotized in usual manner. The diazonium salt solution was added to a solution of 14.4 parts of β-naphthol in 110 parts of 1 N sodium hydroxide solution. After coupling being terminated, the precipitated dyestuff was suction-filtered, washed with sodium carbonate solution and dried. 40.1 Parts of a dyestuff were obtained which had the formula

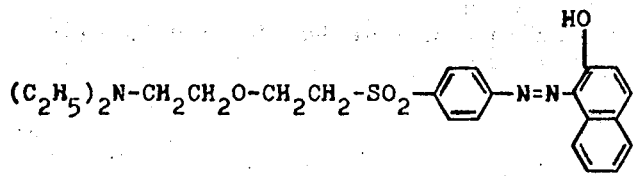

It dyed polyacrylonitrile and acid-modified polyester fibers from an acid bath in fast orange shades.

EXAMPLE 4

44.2 Parts of the compound of the formula

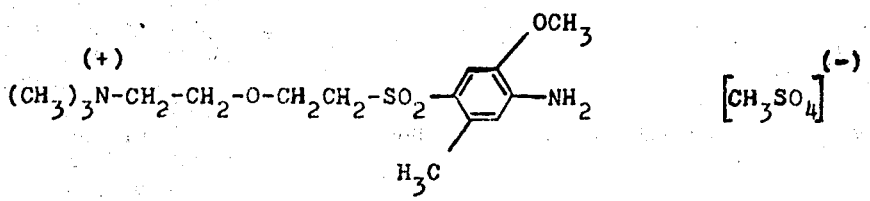

were diazotized in usual manner and coupled with 17.4 parts of N-methyl-N-β-cyanethyl aniline in hydrochloric acid solution. After coupling being terminated, the dyestuff was salted out by adding sodium chloride, suction-filtered, washed with sodium chloride solution and dried at 60°C. 56.2 Parts of a dyestuff of the formula

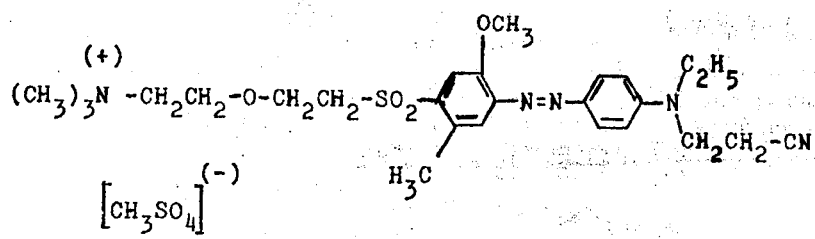

were obtained. It dyed polyacrylonitrile and acid-modified polyester fibers in fast red shades.

The following Table contains further dyestuffs of the invention as well as the shades they dye on polyacrylonitrile fibers and acid-modified polyester fibers:

T A B L E

| Diazo component | coupling component | Shade |
|---|---|---|
| $(CH_3)_2N-(CH_2)_2-O-(CH_2)_2-SO_2$-C$_6$H$_3$(NH$_2$) | 2,4-dimethyl-N-ethyl-N-(2-cyanoethyl)aniline | orange |
| dito | N-ethyl-N-(2-cyanoethyl)aniline derivative | orange |
| dito | N-(2-cyanoethyl)-N-(2-phenylethyl)aniline derivative | orange |
| dito | pyridine derivative with CH$_3$, CN, NH-(CH$_2$)$_3$-OCH$_3$, (CH$_2$)$_3$-OCH$_3$ substituents | yellow |
| dito | pyrimidine derivative with NHCH$_3$, N$^H$CH$_3$, CH$_3$ substituents | yellow |
| $(CH_3)_2N-(CH_2)_2-O-(CH_2)_2-SO_2$-C$_6$H$_3$(NH$_2$) | N-methyl-N-(2-cyanoethyl)naphthylamine | red |

TABLE -continued

| Diazo component | coupling component | Shade |
|---|---|---|
| dito | 2,3-dimethylindole (2-CH$_3$, 3-CH$_3$ indole with NH) | yellow |
| dito | 5-amino-3-methyl-4-methyl-1-phenylpyrazole | yellow |
| dito | 2-phenyl-3-methyl-1-methylindole | yellow |
| $(CH_3)_2N-CH_2CH_2-O-CH_2-CH_2-SO_2$—(3-Br, 4-NH$_2$ phenyl) | 4-[N(CH$_2$CH$_3$)(CH$_2$CH$_2$CN)]aniline | red |
| $(CH_3)_2N-CH_2CH_2-O-CH_2-CH_2-SO_2$—(3-Br, 4-NH$_2$ phenyl) | 2,6-bis(methylamino)-3-cyano-4,5-dimethylpyridine | orange |
| dito | 5-amino-3-methyl-4-methyl-1-phenylpyrazole | yellow |
| dito | 1-methyl-2-hydroxynaphthalene | orange |

TABLE -continued
| Diazo component | coupling component | Shade |
|---|---|---|
| 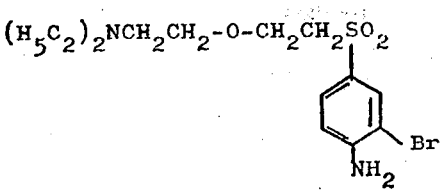 | 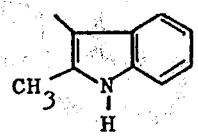 | yellow |
| 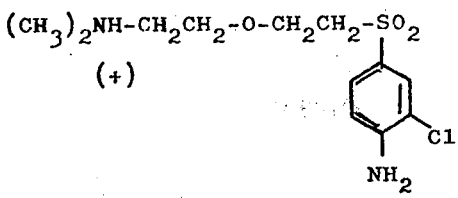 | 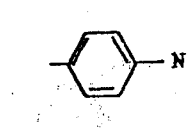 | orange |
| 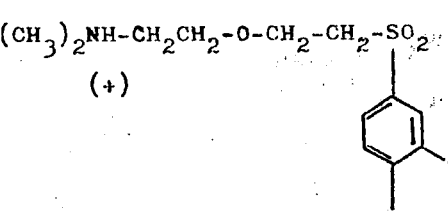 | 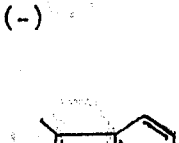 | yellow |
| dito | 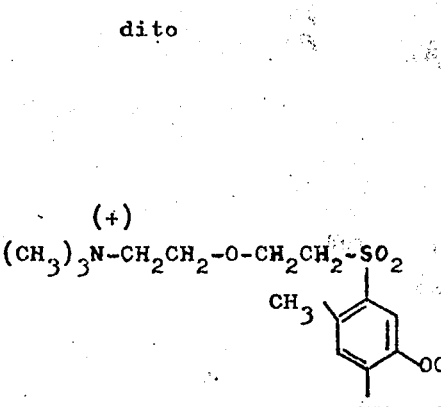 | yellow |
| 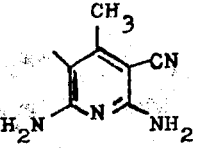 | 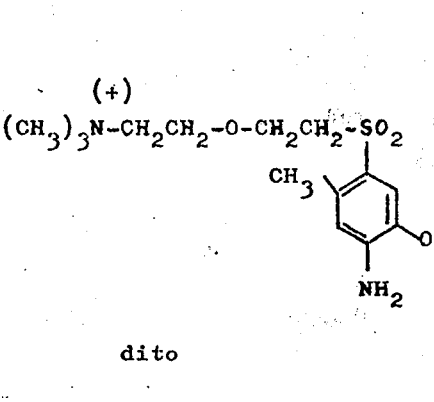 | red |
| dito |  | red |
| 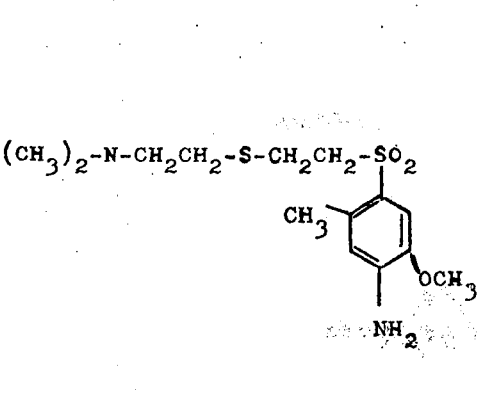 |  | orange |

TABLE -continued
| Diazo component | coupling component | Shade |
|---|---|---|
| 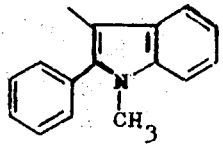 | 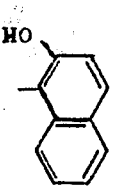 | orange |
| dito | 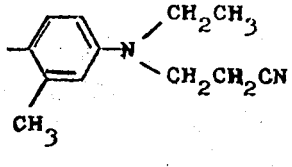 | orange |
| dito | 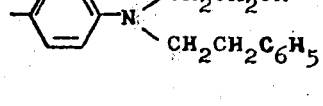 | bluish red |
| dito | 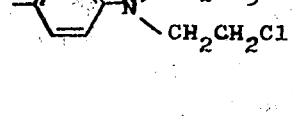 | yellowish red |
| dito | 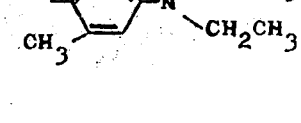 | red |
| dito | 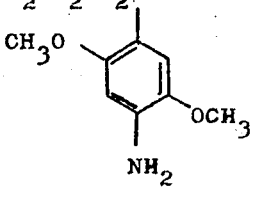 | bordo |
| 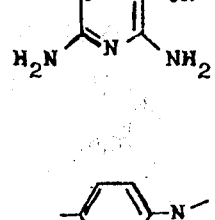 | | orange |
| dito | | red |

TABLE -continued

| Diazo component | coupling component | Shade |
|---|---|---|
| $(CH_3)_2NCH_2CH_2-O-CH_2CH_2-SO_2-$ [1-(SO$_2$)-4-amino-naphthalene] | 4-methylphenyl-N(CH$_3$)(CH$_2$CH$_2$CN) | red |
| $(C_4H_9)_2NCH_2CH_2-O-CH_2CH_2-SO_2-$ [1-(SO$_2$)-4-amino-naphthalene] | 4-methylphenyl-N(C$_4$H$_9$)$_2$ | red |
| $(CH_3)_2NCH_2CH(CH_3)-O-CH_2CH_2-SO_2-$ [1-(SO$_2$)-4-amino-naphthalene] | 4-methylphenyl-N(C$_2$H$_5$)(CH$_2$CH$_2$Cl) | red |
| $(CH_3)_3\overset{(+)}{N}CH_2CH_2CH_2-O-CH_2CH_2-SO_2-$ [2-OCH$_3$, 3-NH$_2$ phenyl], $Cl^{(-)}$ | 4-methyl-N-methyl-tetrahydroquinoline | bluish red |
| dito | 1,3-dimethylindole (N-CH$_3$) | yellow |
| dito | 2,6-bis(methylamino)-3-cyano-4,5-dimethylpyridine | yellow |
| $(CH_3)_3\overset{(+)}{N}CH_2CH_2CH_2-O-CH_2CH_2-SO_2-$ [2-OCH$_3$, 3-NH$_2$ phenyl], $Cl^{(-)}$ | 3-amino-1-phenylpyrazole ($H_2N$-C, N-phenyl) | yellow |

TABLE -continued
| Diazo component | coupling component | Shade |
|---|---|---|
| 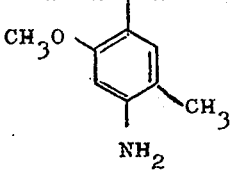 | 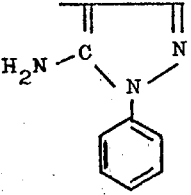 | yellow |
| 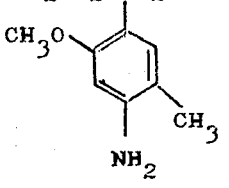 | 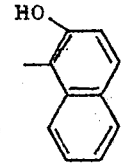 | orange |
| dito | 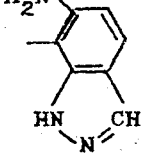 | red |
| 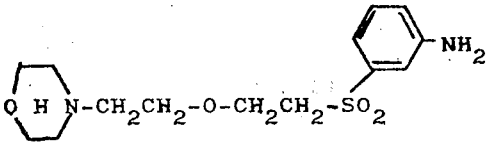 | 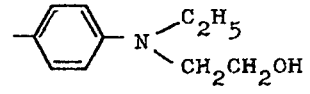 | red |
| 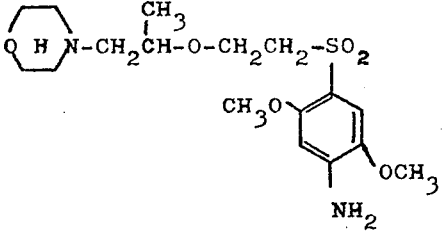 | 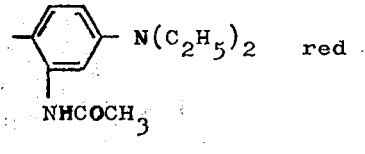 | red |
We claim:
1. A basic azo dyestuff, free from sulfo groups and having the formula
wherein $Z_1$ is the quaternary salt of the formula
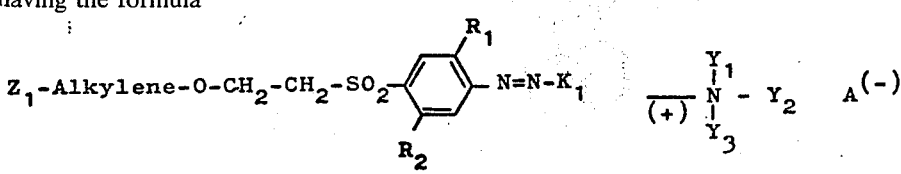

wherein $Y_1$ and $Y_2$ are identical or different and each is alkyl of one to six carbon atoms, or benzyl or cyclohexyl, $Y_3$ is hydrogen, alkyl of one to four carbon atoms, benzyl or alkoxy and/or $Y_1$, $Y_2$ and/or $Y_3$ together with the N-atom form the morpholine, piperidine or pyridine ring and $A^{(-)}$ is an anion, alkylene is alkylene of two or three carbon atoms, $R_1$ is hydrogen, chlorine, bromine, methoxy, ethoxy, methyl or ethyl, $R_2$ is hydrogen, methoxy, ethoxy, methyl or ethyl and $K_1$ is a radical of the formula

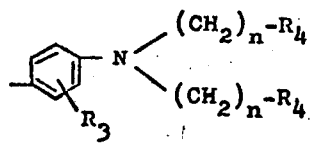

in which $R_3$ is hydrogen, alkyl of one to four carbon atoms, alkoxy of one to four carbon atoms, acetylamino or chlorine or bromine, the radicals $R_4$ are identical or different and each is hydrogen, hydroxy, cyano, acetoxy or alkoxy of one to four carbon atoms or phenyl or chlorine or bromine and the indices $n$ are identical or different and each is 1, 2, 3, or 4.

2. The dyestuff as claimed in claim 1 of the formula

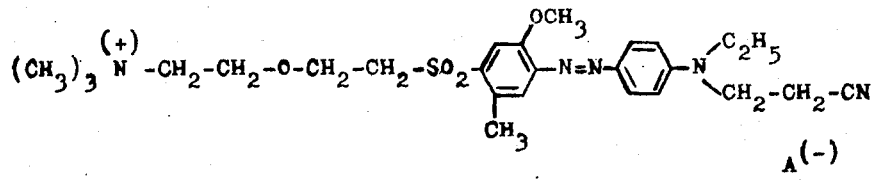

wherein $A^{(-)}$ is an anion which is a chloride, sulfate, acetate or $CH_3OSO_4^{(-)}$ or

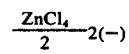

3. The dyestuff as claimed in claim 1 of the formula

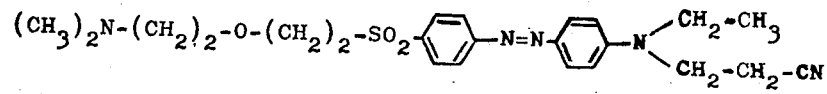

* * * * *